May 26, 1936. C. O. WALPER 2,041,799

EXPOSED CORNER IN WALLBOARD CONSTRUCTION

Filed Aug. 27, 1934

INVENTOR:
CURRY ORA WALPER

Alex E. MacRae
BY            ATTORNEY.

Patented May 26, 1936

2,041,799

UNITED STATES PATENT OFFICE 2,041,799

EXPOSED CORNER IN WALLBOARD CONSTRUCTION

Curry Ora Walper, Hamilton, Ontario, Canada

Application August 27, 1934, Serial No. 741,690

2 Claims. (Cl. 72—121)

This invention relates to improvements in exposed corners in building construction wherein wallboard is used as sheeting material and particularly where the wall surface is to be adapted to receive decoration such as by tinting, papering or the like.

The object of the invention is to provide a strong and attractive corner construction well adapted for convenient application of a plastic joint filler for covering the corner margins and presenting a smooth surface for decoration.

In the accompanying drawing illustrating the invention—

Figure 1:
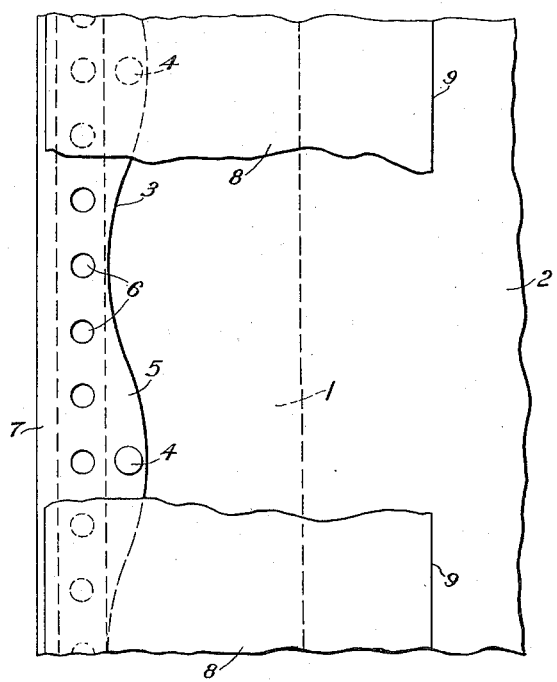
Figure 2:
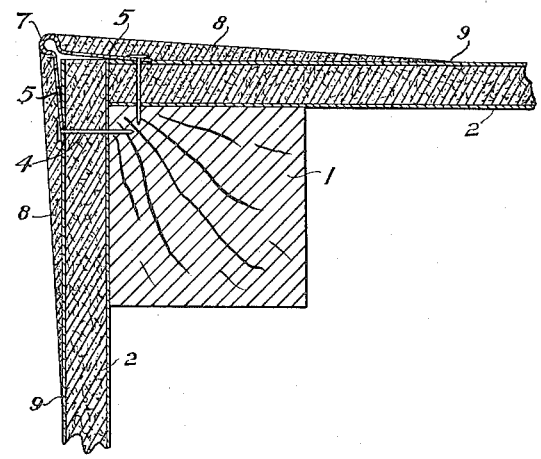

Figure 1 is a side elevation view with the joint filler partially broken away; and Figure 2 is a plan view of the corner in section.

In the drawing, 1 represents the corner frame member or stud, 2 wallboards on the meeting faces and overlapping at the corner, 3 a metallic corner bead placed over the boards and 4 nails securing the corner bead in place and passing through the wallboards into the stud. The corner bead 3 has flanges 5, preferably perforated as at 6, united together by a rounded bead 7 which is somewhat raised out of the plane of the flanges bearing on the surfaces of the board to provide a space for a plastic joint filler. The joint filler 8 covers the flanges, is arranged flush with the bead and smoothly merges or feathers into the surface of the board as at 9. The exposed rounded portion of the bead 6 provides a rigid impact corner surface which protects the corner joint from rupture or disfigurement and, at the same time, affords easy alignment of the joint filler which adheres to the perforated flanges and rests against the bead.

It will be observed that in the corner joint thus provided the wall tapers slightly from the corner until the joint filler merges into the wall surface constructed by the wallboard. Any desired type of decoration is then easily applied. The corner joint is durable and has an attractive finished appearance.

I claim:

1. In a wall construction, a corner frame member, wallboards meeting on said frame member and secured thereto, an angular member having flanges secured to the outer surfaces of said boards and integrally united by rounded bead forming an impact corner member, and a joint filler covering said flanges, engaging the sides of said bead and merging into the surfaces of said boards.

2. In a wall construction, a corner stud, abutting wallboards secured to meeting faces of said stud, an angular metallic member having flanges secured to the outer surfaces of said boards, said flanges being integrally united by a rounded bead forming an exposed impact corner member, and joint filler of substantial thickness covering said flanges and the adjacent portions of said bead and merging into the surface of said boards at points spaced from said corner.

CURRY ORA WALPER.